United States Patent [19]

Hillman, Jr.

[11] 3,790,903

[45] Feb. 5, 1974

[54] TRANSISTOR MULTIVIBRATOR SWITCHABLE BETWEEN TWO RATIOS OF OFF/ON PULSE TIMES

[75] Inventor: Allen F. Hillman, Jr., Muncy, Pa.

[73] Assignee: GTE Laboratories Incorporated, Waltham, Mass.

[22] Filed: Dec. 4, 1972

[21] Appl. No.: 311,930

[52] U.S. Cl. .............................. 331/113 R, 331/179
[51] Int. Cl. ............................................ H03k 3/282
[58] Field of Search......... 331/113 R, 144, 145, 179

[56] References Cited

UNITED STATES PATENTS

| | | | |
|---|---|---|---|
| 3,336,536 | 8/1967 | Dame | 331/179 X |
| 3,408,572 | 10/1968 | Wolf et al. | 331/179 X |

*Primary Examiner*—Herman Karl Saalbach
*Assistant Examiner*—Siegfried H. Grimm
*Attorney, Agent, or Firm*—Irving M. Kriegsman

[57] ABSTRACT

A dual-rate free-running multivibrator circuit for producing trains of output pulses having different ratios of off/on pulse times. The multivibrator circuit includes first and second transistors and respective first and second capacitors arranged for operation in a conventional multivibrator fashion, and first and second variable-resistance arrangements respectively connected to the first and second capacitors for achieving variable RC time constants for establishing first and second sets of off and on times for the first and second transistors. Each of the variable-resistance arrangements includes first and second resistors connected in series with the associated capacitor and a transistor connected in parallel with the first resistor.

To operate the dual-rate multivibrator circuit to produce a train of output pulses having a first ratio of off/on pulse times, a control voltage having a predetermined first value is applied to the transistor included in the first variable-resistance arrangement and causes the transistor to operate in its conducting state whereby it shunts the first resistor connected in parallel therewith. The transistor in the other (second) variable-resistance arrangement operates at this time in its non-conducting state. As a result, a first set of RC time constants is established for controlling the operation of the first and second transistors, and a first train of output pulses having a first ratio of off/on pulse times is produced at an output terminal connected to the second transistor. To produce a train of output pulses having a second ratio of off/on pulse times, a control voltage having a predetermined second value is applied to the transistor included in the second variable-resistance arrangement and causes the transistor to operate in its conducting state whereby it shunts the first resistor connected in parallel therewith. The transistor in the other (first) variable-resistance arrangement operates at this time in its non-conducting state. As a result, a second set of RC time constants is established for controlling the operation of the first and second transistors, and a second train of output pulses having a second ratio of off/on pulse times is produced at the output terminal.

9 Claims, 1 Drawing Figure

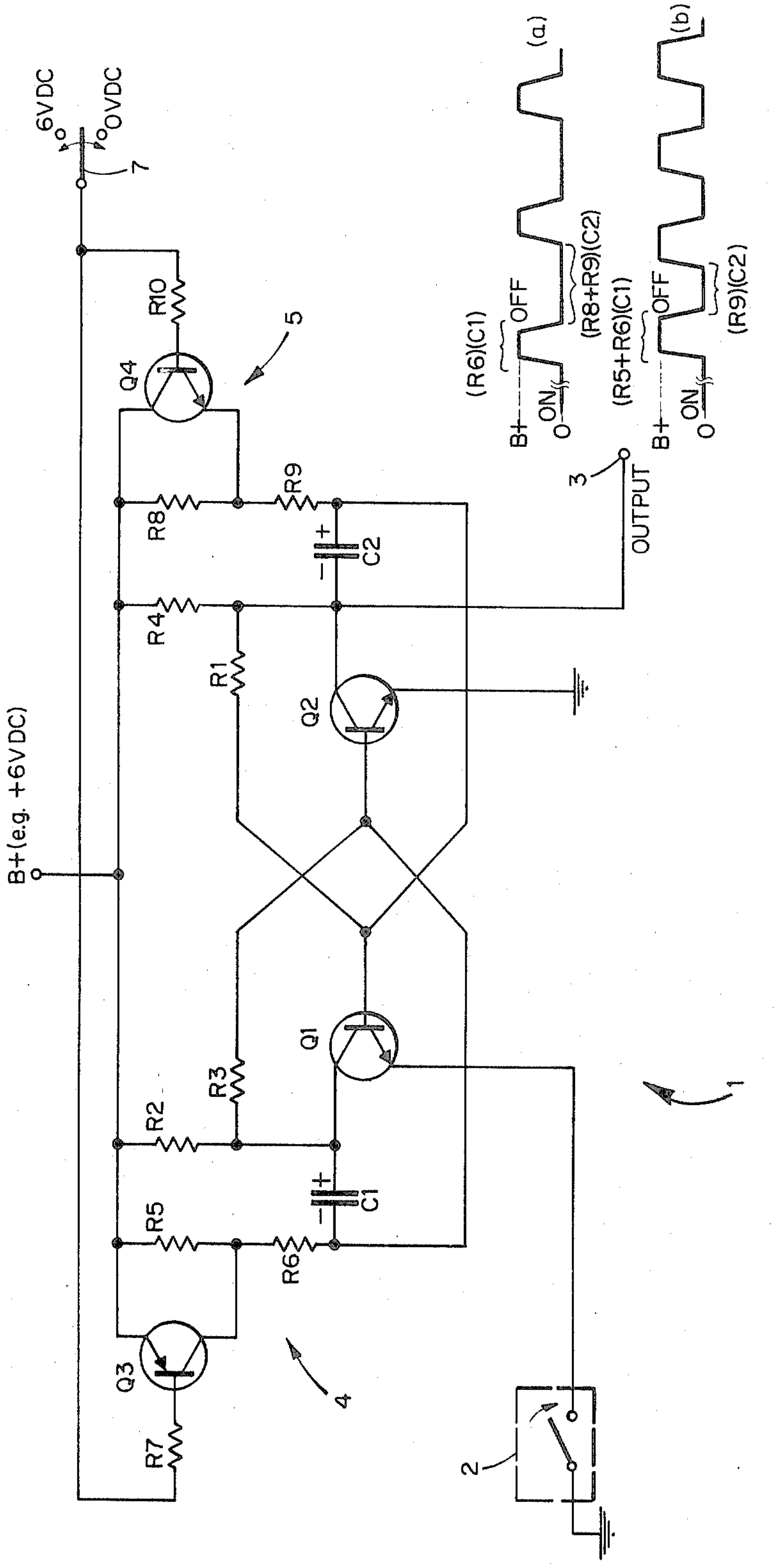
6VDC
0VDC
7
B+(e.g. +6VDC)
R10
Q4
5
R8
R9
C2
R4
R1
Q2
OUTPUT
3
R2
R3
Q1
R5
C1
R6
Q3
R7
4
2
1
(a)
(b)
(R6)(C1)
OFF
(R8+R9)(C2)
B+
ON
0
(R5+R6)(C1)
(R9)(C2)

TRANSISTOR MULTIVIBRATOR SWITCHABLE BETWEEN TWO RATIOS OF OFF/ON PULSE TIMES

BACKGROUND OF THE INVENTION

The present invention relates to a multivibrator circuit and, more particularly, to a dual-rate free-running multivibrator circuit for producing first and second trains of output pulses having different ratios of off/on pulse times.

There are various applications in which it is desired to utilize trains of pulses having different ratios of off-/on pulse times for performing various control functions. For example, there is described in a co-pending application of Allen F. Hillman, (D–728), Ser. No. 311,927 filed concurrently herewith, entitled "Electronic Control Module for Anti-skid Braking Systems," and assigned to the same assignee, an automatic vehicle anti-skid control system in which first and second pulse trains having different ratios of off/on pulse times are employed for selectively controlling the operation of a brake control mechanism to prevent wheel lock-up conditions (skidding) during deceleration of vehicles under two different sets of road surface conditions. More specifically, when a vehicle decelerates at a certain critical rate on a road surface having a low coefficient of friction (e.g., a wet road surface, or a snow, ice, or oil-covered road surface) and is about to experience a wheel lock-up or skidding condition, a train of pulses is applied to the brake control mechanism having a particular ratio of off/on pulse times calculated to prevent the actual occurrence of the wheel lock-up condition. Similarly, when a vehicle decelerates at the critical rate on a road surface having a high coefficient of friction (e.g., a dry road surface) and is about to experience a wheel lock-up condition, a train of pulses is applied to the brake control mechanism having a different ratio of off/on pulse times which, again, is calculated to prevent the actual occurrence of the wheel lock-up condition.

The present invention is directed to a dual-rate free-running multivibrator circuit which, although having general utility, is particularly useful in automatic anti-skid control systems of the type described hereinabove.

SUMMARY OF THE INVENTION

In accordance with the present invention, a dual-rate multivibrator circuit is provided for producing first and second trains of output pulses having different ratios of off/on times. The dual-rate multivibrator circuit includes first and second transistors of the same conductivity type and each having a base, emitter and a collector. Means are provided for connecting the collectors of the first and second transistors to a source of dc voltage and for connecting the collectors of the first and second transistors to the bases of the second and first transistors, respectively. A means connects the emitter of one of the transistors to a source of reference potential. First and second capacitances are connected between the collectors of the first and second transistors and the bases of the second and first transistors, respectively, and first and second resistance means are connected in series with the first and second capacitances, respectively, and the source of dc voltage.

The dual-rate multivibrator circuit also includes a first switch means coupled to the emitter of the other of the transistors and to the source of reference potential and having a first operating state and a second operating state. A means operates when the first switch means is in its first operating state to bias the said other of the transistors in its non-conducting state and to bias the said one of the transistors in its conducting state, and a means operates when the first switch means is in its second operating state to cause the first and second transistors to switch between their conducting and non-conducting state, thereby initiating multivibrator action. The second transistor operates to produce an output pulse at its collector each time it switches between its conducting and non-conducting states.

A second switch means is also provided in the dual-rate multivibrator circuit which operates to produce a first control voltage or a second control voltage. A first control means coupled to the second switch means and to the first resistance means operates when the first switch means is in its first operating state and when the second switch means produces its first control voltage to change the resistance value of the first resistance means whereby a first pulse train having a first ratio of off/on pulse times is produced at the collector of the second transistor. The off time of each pulse in the first pulse train is determined by the changed value of the first resistance means and the value of the first capacitance, and the on time of each pulse is determined by the resistance value of the second resistance means and the value of the second capacitance. A second control means coupled to the second switch means and to the second resistance means operates when the first switch means is in its second operating state and when the second switch means produces its second control voltage to change the resistance value of the second resistance means whereby a second pulse train having a second ratio of off/on pulse times is produced at the collector of the second transistor. The on time of each pulse in the second pulse train is determined by the changed value of the second resistance means and the value of the second capacitance and the off time of each pulse is determined by the resistance value of the first resistance means and by the value of the first capacitance.

BRIEF DESCRIPTION OF THE DRAWING

The invention will be more fully understood from the following detailed description, taken in conjunction with the accompanying drawing, in which the single FIGURE illustrates in schematic diagram form a dual-rate free-running multivibrator circuit in accordance with the present invention.

GENERAL DESCRIPTION OF THE INVENTION

Referring now to the single FIGURE, there is shown in schematic diagram form a dual-rate free-running multivibrator circuit 1 in accordance with the present invention. The dual-rate free-running multivibrator circuit 1 includes a pair of npn transistors Q1 and Q2 which, as is evident from the FIGURE, are interconnected in a common free-running multivibrator configuration. More specifically, the base of the transistor Q1 is coupled through a commutation resistor R1 to the collector of the transistor Q2, and the collector is coupled through a load resistor R2 to a source of positive dc voltage B+. The emitter of the transistor Q1 is connected directly to a switch 2 which, as will be described hereinafter, is operated to cause the multivibrator circuit 1 to operate in a multivibrator fashion. The switch 2 is shown in the FIGURE as a simple mechanical-type two-position switch; however, it is to be appreciated that the switch 2 may also be implemented electronically by a variety of well-known electronic switching elements, for example, by one or more transistors. In a manner similar to the transistor Q1, the base of the transistor Q2 is coupled through a commutation resistor R3 to the collector of the transistor Q1, and the collector is coupled through a load resistor R4 to the source of positive dc voltage B+. The collector of the transistor Q2 is also connected to an output terminal 3 to which output pulses produced at the collector of the transistor Q2 are applied. The emitter of the transistor Q2 is connected directly to ground potential. In addition to the abovementioned circuit components, and as is also common in free-running multivibrator circuits, a capacitor C1 is connected between the collector of the transistor Q1 and the base of the transistor Q2, and a capacitor C2 is similarly connected between the collector of the transistor Q2 and the base of the transistor Q1.

The dual-rate manner of operation of the multivibrator circuit 1 by which first and second trains of output pulses having different ratios of off/on pulse times are produced at the output terminal 3 of the multivibrator circuit 1 is achieved in accordance with the invention by establishing two sets of time constants for controlling the operation of the transistors Q1 and Q2 and, therefore, the off and on times for the transistors Q1 and Q2. This control of the RC time constants and the off/on times of the transistors Q1 and Q2 is accomplished by the inclusion in the multivibrator circuit 1 of a pair of variable-resistance arrangements 4 and 5. As shown in the FIGURE, the variable-resistance arrangement 4 includes a pair of resistors R5 and R6 connected in series with the source of positive dc voltage +B and the capacitor C1, and a pnp transistor Q3 connected in parallel with the resistor R5 via its emitter and collector. The base of the transistor Q3 is coupled through a current-limiting resistor R7 to a switch 7, the purpose of which will be described hereinafter. In a similar fashion as described above, the variable-resistance arrangement 5 includes a pair of resistors R8 and R9 connected in series with the source of positive dc voltage B+ and the capacitor C2, and an npn transistor Q4 connected in parallel with the resistor R8 via its collector and emitter. The base of the transistor Q4 is coupled through a current-limiting resistor R10 to the switch 7.

The switch 7, which is shown schematically in the FIGURE, may be implemented by any one of several well-known devices capable of supplying first and second values of dc voltage to the multivibrator circuit 1. By way of example, in the context of an automatic anti-skid control system, the switch 7 may take the form of a binary-type decelerometer switch which is capable of supplying a dc voltage to the multivibrator circuit 1 having a value of approximately 0 volts dc (for example, when a wheel lock-up condition is imminent on a low coefficient of friction road surface) and approximately +6 volts dc (for example, when a wheel lock-up condition is imminent on a high coefficient of friction road surface). A typical value of the positive dc voltage B+ is +6 volts.

Operation - Quiescent Mode

In the quiescent mode of operation of the dual-rate multivibrator circuit 1, that is, with the switch 2 in its open (ungrounded) position, the emitter of the transistor Q1 is open circuited, and the transistor Q1 operates in its non-conducting, or OFF state. With the transistor Q1 operating in its non-conducting state, the voltage at its collector is at essentially the voltage +B and the voltage at the base of the transistor Q2 at this time is sufficient to forward bias the transistor Q2 into its conducting, or ON state, causing the collector of the transistor Q2 to be at essentially ground potential (approximately 0 volts). The collector of the transistor Q2 remains at essentially ground potential until the switch 2 is placed in its closed (grounded) position.

With the abovedescribed quiescent operating states for the transistors Q1 and Q2, the collector side of the capacitor C1 is at a high value of voltage (at essentially B+), and the other side, by virtue of its connection to the base of the conducting transistor Q2, is at a low value of voltage (at essentially ground potential). Similarly, the collector side of the capacitor C2 is at a low value of voltage, by virtue of the transistor Q2 being in its conducting state, and the other side, by virtue of its connection to the base of the non-conducting transistor Q1, is at a high value of voltage. These voltage conditions affecting the capacitors C1 and C2 cause voltages of essentially equal value to be established across the capacitors C1 and C2 in preparation for initiating multivibrator action once the switch 2 is placed in its closed (grounded) position. Specifically, a charge path exists for charging the capacitor C1 which includes the source of positive dc voltage B+ and the load resistor R2, and a charge path exists for charging the capacitor C2 which includes the source of positive dc voltage B+ and the resistors R8 and R9. The time required for charging each of the capacitors C1 and C2 is determined principally by the values of the aforementioned resistors R2, R8 and R9, and the values of the capacitors C1 and C2.

Operation - Production of Output Pulse Trains Having Different Ratios of Off/On Pulse Times To produce a train of output pulses at the output terminal 3 of the multivibrator circuit 1, the switch 2 is placed in its closed (grounded) position and the switch 7 is operated in one or the other of its two voltage-supplying positions. With the switch 7 in a first one of its two positions, for example, in its 0-volt position, zero volts are supplied to the multivibrator circuit 1 and the multivibrator circuit 1 operates to produce output pulses at the output terminal 3 having a first ratio of off/on times; with the switch 7 in its +6-volt position, +6 volts are supplied to the multivibrator circuit 1 and the multivibrator circuit 1 operates to produce output pulses at the output terminal 3 having a second ratio of off/on times. Assuming initially that the switch 2 is closed and that the switch 7 is in its 0-volt position, the operation of the multivibrator circuit 1 may be explained as follows.

With the switch 2 in its closed position, the emitter of the transistor Q1 is placed at ground potential, whereby multivibrator action is initiated. Specifically, with the emitter of the transistor Q1 placed at ground potential, the voltage earlier established across the capacitor C2 (before closure of the switch 2) is applied to the base of the transistor Q1. This voltage is positive and of sufficient value to initiate forward biasing the transistor Q1 into its conducting (on) state. As the transistor Q1 is initially biased into its conducting state, the capacitor C1 discharges, causing a negative voltage spike to be applied to the base of the transistor Q2. This negative voltage spike reverse biases the transistor Q2 into its non-conducting (off) state, resulting in an increase in the collector voltage of the transistor Q2 in a positive direction. This collector voltage is coupled via the commutation resistor R1 into the base of the transistor Q1 and causes the transistor Q1 to operate more fully in its conducting state.

With the transistor Q2 operating in its non-conducting state and the transistor Q1 operating in its conducting state, the capacitor C1 is gradually charged to a voltage level for again forward biasing the transistor Q2 into its conducting state. The charge path of the capacitor C1 at this time includes the source of positive dc voltage B+ and the effective resistance of the variable-resistance arrangement 4. The effective resistance of the variable-resistance arrangement 4 is determined at this time by the state of the switch 7. Specifically, with the switch 7 in its 0-volt position, as assumed hereinabove, a zero-voltage condition is established at the base of the pnp transistor Q3. Since the emitter of the transistor Q3 is at a positive voltage (+B) with respect to the base, the transistor Q3 is forward biased into its conducting state. While in the conducting state, the transistor Q3 shunts the resistor R5 and thereby establishes an effective resistance for the variable-resistance arrangement 4 having a value equal to the value of the resistor R6. Thus, the capacitor C1 is charged at this time through the un-shunted resistor R6 and not through the series combination of resistors R5 and R6. (A small amount of additional voltage is developed across the capacitor C1 at this time by virtue of current flow through the load resistor R2 and the commutation resistor R3, but the value of this additional voltage is negligible when compared with the value of voltage developed across the capacitor C1 by virtue of current flow through the resistor R6). It is to be noted that as the above operations involving the capacitor C1 and the variable-resistance arrangement 4 take place, the npn transistor Q4 provided in the other variable-resistance arrangement 5 is not operated in its conducting state, that is, it is reverse biased, by virtue of its emitter being at a positive voltage greater than 0 volts.

When the value of the voltage across the capacitor C1 increases to the value of the forward-bias voltage of the transistor Q2, the transistor Q2 once again starts to operate in its conducting state. As the transistor Q2 starts to operate in its conducting state and its collector voltage starts to drop to its low value, the capacitor C2 discharges, causing a negative voltage spike to be applied to the base of the transistor Q1. This negative voltage spike serves to reverse bias the transistor Q1 in its non-conducting state and to cause the voltage at the collector of the transistor Q1 to increase in a positive direction. The collector voltage of the transistor Q1 is coupled into the base of the transistor Q2 (via the commutation resistor R3) and causes the transistor Q2 to operate more fully in its conducting state. The capacitor C2 is then gradually charged again, via a charge path including the source of positive dc voltage B+ and the resistors R8 and R9, until the voltage across the capacitor C2 reaches the forward bias voltage of the transistor Q1. This charging operation therefore determines the off time for the transistor Q1. When the voltage across the capacitor C2 reaches the forward bias voltage of the transistor Q1, the transistor Q1 starts to operate again in its conducting state, thereby initiating the turn off of the transistor Q2. The above-described operation of the multivibrator circuit 1 continues until such time as the switch 2 is placed in its open position at which time the multivibrator action of the multivibrator circuit 1 is terminated.

It is evident from the abovedescribed discussion, therefore, that with the switch 7 in its 0-volt position, the off time of the transistor Q1 and the on time of the transistor Q2 are each determined essentially by the values of the resistors R8 and R9 and the capacitor C2 and the on time of the transistor Q1 and the off time of the transistor Q2 are each determined essentially by the value of the resistor R6 and the capacitor C1. A typical form of the train of output pulses produced at the collector of the transistor Q2 and, thus, at the output terminal 3, when the switch 7 is in its 0-volt position is shown at (*a*) in the FIGURE.

The operation of the multivibrator circuit 1 with the switch 7 in its 6-volt position is essentially the same as that described hereinabove. However, in this case, the transistor Q4 is forward biased into its conducting state, by virtue of the voltage at its base being sufficiently positive (approximately +6 volts) with respect to the emitter, and the transistor Q3 is reverse biased in its non-conducting state, by virtue of the value of voltage at its base (approximately +6 volts) being essentially equal to the value of the voltage (e.g., +6 volts) at its emitter. With the transistor Q4 operating in its conducting state, the resistor R8 is shunted whereby the unshunted resistor R9 serves as the principal charging resistor for the capacitor C2. In the present case, therefore, the off time of the transistor Q1 and the on time of the transistor Q2 are each determined essentially by the values of the resistor R9 and the capacitor C2 and the on time of the transistor Q1 and the off time of the transistor Q2 are each determined essentially by the values of the resistors R5 and R6 and the capacitor C1. A typical form of the train of output pulses produced at the collector of the transistor Q2 and, thus, at the output terminal 3, when the switch 7 is in its +6 volt position is shown at (*b*) in the FIGURE.

It is clear, therefore, that by the appropriate selection of values for the resistors R5, R6, R8, and R9 and for the capacitors C1 and C2, the off/on times of the pulses produced at the collector of the transistor Q2 and, therefore, at the output terminal 3, may be made to have a variety of different possible values. As a result, pulse trains having different repetition rates may be readily achieved.

While there has been shown and described what is considered a preferred embodiment of the invention, it will be obvious that various changes and modifications may be made therein without departing from the invention as called for in the appended claims.

What is claimed is:

1. A dual-rate multivibrator circuit for selectively producing first and second trains of output pulses having different ratios of off/on pulse times, comprising:

a source of dc voltage;

a source of reference potential;

a first transistor of a first conductivity type and having a base, emitter, and a collector;

a second transistor of the first conductivity type and having a base, emitter, and a collector;

means connecting the collectors of the first and second transistors to the source of dc voltage;

means connecting the collector of the first transistor to the base of the second transistor and connecting the collector of the second transistor to the base of the first transistor;

means connecting the emitter of one of the transistors to the source of reference potential;

a first capacitance connected between the collector of the first transistor and the base of the second transistor;

a second capacitance connected between the collector of the second transistor and the base of the first transistor;

first resistance means connected in series with the first capacitance and the source of dc voltage;

second resistance means connected in series with the second capacitance and the source of dc voltage;

first switch means coupled to the emitter of the other of the transistors and to the source of reference potential and having a first operating state and a second operating state;

means operative when the first switch means is in its first operating state to bias the said other of the transistors in its non-conducting state and to bias the said one of the transistors in its conducting state;

means operative when the first switch means is in its second operating state to cause the first and second transistors to switch between their conducting and non-conducting states, thereby initiating multivibrator action, said second transistor operating to produce an output pulse at its collector each time it switches between its conducting and non-conducting states;

second switch means operative to produce a first control voltage or a second control voltage;

first control means coupled to the second switch means and to the first resistance means and operative when the first switch means is in its first operating state and when the second switch means produces its first control voltage to change the resistance value of the first resistance means whereby a first pulse train having a first ratio of off/on pulse times is produced at the collector of the second transistor, the off time of each pulse in the first pulse train being determined by the changed value of the first resistance means and the value of the first capacitance and the on time of each pulse being determined by the resistance value of the second resistance means and the value of the second capacitance; and second control means coupled to the second switch means and to the second resistance means and operative when the first switch means is in its second operating state and when the second switch means produces its second control voltage to change the resistance value of the second resistance means whereby a second pulse train having a second ratio of off/on pulse times is produced at the collector of the second transistor, the on time of each pulse in the second pulse train being determined by the changed value of the second resistance means and the value of the second capacitance and the off time of each pulse being determined by the resistance of the first resistance means and by the value of the first capacitance.

2. A dual-rate multivibrator circuit in accordance with claim 1 wherein:

the second switch means includes a decelerometer switch.

3. A dual-rate multivibrator circuit in accordance with claim 1 wherein:

the first resistance means includes a pair of series-connected resistances;

the first control means includes a control transistor of the opposite conductivity type and having a base, emitter, and collector, the base of the control transistor being coupled to the second switch means, the collector being coupled to the juncture of the pair of series-connected resistances of the first resistance means, and the emitter being coupled to the source of dc voltage whereby the control transistor is connected via its collector and emitter across one of the pair of series-connected resistances, said control transistor being biased into its conducting state when the second switch means produces its first control voltage whereby it shunts the resistance across which it is connected and thereby changes the value of the first resistance means to the value of the unshunted resistance;

the second resistance means includes a pair of series-connected resistances; and the second control means includes a control transistor of the first conductivity type and having a base, emitter and collector, the base of the control transistor being coupled to the second switch means, the emitter being coupled to the juncture of the pair of series-connected resistances of the second resistance means, and the collector being coupled to the source of dc voltage, whereby the control transistor is connected via its collector and emitter across one of the pair of series-connected resistances, said control transistor being biased in its conducting state when the second switch means produces its second control voltage whereby it shunts the resistance across which it is connected and changes the value of the second resistance means to the value of the unshunted resistance.

4. A dual-rate multivibrator circuit in accordance with claim 3 wherein:

the source of reference potential provides a voltage at ground potential.

5. A dual-rate multivibrator circuit in accordance with claim 3 wherein:

the first and second transistors and the control transistor included in the second control means are of the npn type;

the control transistor included in the first control means if of the pnp type;

the source of dc voltage is a positive voltage source; and the first and second control voltages produced by the second switch means are positive voltages.

6. A dual-rate multivibrator circuit in accordance with claim 5 wherein:

the second switch means includes a decelerometer switch.

7. A dual-rate multivibrator circuit in accordance with claim 6 wherein:

the means connecting the collectors of the first and second transistors to the source of dc voltage includes a resistance between the collector of the first transistor and the source of dc voltage and a resistance between the collector of the second transistor and the source of dc voltage.

8. A dual-rate multivibrator circuit in accordance with claim 7 wherein:

the means connecting the collector of the first transistor to the base of the second transistor and connecting the collector of the second transistor to the base of the first transistor includes a resistance between the collector of the first transistor and the base of the second transistor and a resistance between the collector of the second transistor and the base of the first transistor.

9. A dual-rate multivibrator circuit in accordance with claim 8 wherein:

the source of reference potential provides a voltage at ground potential.

* * * * *